United States Patent [19]
Jaggar

[11] Patent Number: 5,568,646
[45] Date of Patent: Oct. 22, 1996

[54] MULTIPLE INSTRUCTION SET MAPPING

[75] Inventor: David V. Jaggar, Cherry Hinton, United Kingdom

[73] Assignee: Advanced Risc Machines Limited, Cambridge, United Kingdom

[21] Appl. No.: 308,838

[22] Filed: Sep. 19, 1994

[30] Foreign Application Priority Data

May 3, 1994 [GB] United Kingdom ............... 9408873

[51] Int. Cl.$^6$ ........................................... G06F 9/00
[52] U.S. Cl. ................... 395/800; 395/375; 364/DIG. 1; 364/258; 364/259.9; 364/231.8; 364/237.9
[58] Field of Search .................... 395/800, 500, 395/375, 775

[56] References Cited

U.S. PATENT DOCUMENTS

| | | | |
|---|---|---|---|
| 4,274,138 | 6/1981 | Shimokawa | 364/200 |
| 4,839,797 | 6/1989 | Katori et al. | 395/375 |
| 5,392,408 | 2/1995 | Fitch | 395/375 |
| 5,475,824 | 12/1995 | Grochowski et al. | 395/375 |
| 5,481,684 | 1/1996 | Richter et al. | 395/375 |
| 5,524,211 | 6/1996 | Woods et al. | 395/200.1 |

*Primary Examiner*—Mehmet Geckil
*Attorney, Agent, or Firm*—Albert C. Smith

[57] ABSTRACT

A data processing system is described utilising multiple instruction sets. The program instruction words are supplied to a processor core 2 via an instruction pipeline 6. As program instruction words of a second instruction set pass along the instruction pipeline, they are mapped to program instruction words of the first instruction set. The second instruction set has program instruction words of a smaller bit size than those of the first instruction set and is a subset of the first instruction set. Smaller bit size improves code density, whilst the nature of the second instruction set as a subset of the first instruction set enables a one-to-one mapping to be efficiently performed and so avoid the need for a dedicated instruction decoder for the second instruction set.

13 Claims, 9 Drawing Sheets

| 3 1 | 2 2 8 7 | 2 2 6 5 | 2 2 4 3 | 2 2 2 1 | 2 0 | 1 9 | 1 6 | 1 5 | 1 2 | 1 1 | 8 | 7 | 5 | 4 | 3 | 0 |
|---|---|---|---|---|---|---|---|---|---|---|---|---|---|---|---|---|
| Cond | 00 | 1 | OpCode | S | Rn | Rd | Operand2 | | | | | | | | | |
| Cond | 000000 | A | S | Rd | Rn | Rs | 1001 | Rm | | | | | | | | |
| Cond | 00010 | B | 00 | Rn | Rd | 0000 | 1001 | Rm | | | | | | | | |
| Cond | 01 | I | P | U | B | W | L | Rn | Rd | Offset | | | | | | |
| Cond | 011 | | | | | | | xxxxxxxxxxxxxxxxxxxx | | | | | | 1 | xxxx | |
| Cond | 100 | P | U | S | W | L | Rn | Register List | | | | | | | | |
| Cond | 101 | L | | | | | | Offset | | | | | | | | |
| Cond | 110 | P | U | N | W | L | Rn | CRd | CP# | Offset | | | | | | |
| Cond | 1110 | CP Opc | | | | CRn | CRd | CP# | CP | 0 | CRm | | | | | |
| Cond | 1110 | CP Opc | | | L | CRn | Rd | CP# | CP | 1 | CRm | | | | | |
| Cond | 1111 | | | | | ignored by processor | | | | | | | | | | |

*Fig.7*

| 15 | 14 | 13 | 12 | 11 | 10 | 8 | 7 | 5 | 4 | 3 | 2 | 0 |
|---|---|---|---|---|---|---|---|---|---|---|---|---|
| 0 | 0 | 0 | 00 | | | Rd | | Rs | 0 | OP | Immediate | |
| 0 | 0 | 0 | 00 | | | Rd | | Rs | 1 | OP | Register | |
| 0 | 0 | 0 | OP=1-3 | | | Rd | | Immediate | | | | |
| 0 | 0 | 0 | OP=0-2 | | | Rd | | Rs | | Immediate | | |
| 0 | 0 | 1 | 1 | 1 | | OP1 | | Rd/Rs1 | | OP2 | Rs2 | |
| 0 | 1 | 0 | OP | | | Rd/Rs | | Immediate | | | | |
| 0 | 1 | 0 | 1 | 1 | | Rd | | PC Relative Offset | | | | |
| 0 | 1 | 1 | B | L | | Rd/Rs | | SP Relative Offset | | | | |
| 1 | 0 | 0 | 0 | L | | Rn | | Rd/Rs | B | U | Immediate | |
| 1 | 0 | 0 | 1 | L | | Rn | | Rd/Rs | B | U | Register | |
| 1 | 0 | 1 | B | L | | Rn | | Rd/Rs | | Immediate | | |
| 1 | 1 | 0 | 0 | L | | Rn | | Register List | | | | |
| 1 | 1 | 0 | 1 | SP | | Rd | | Effective Address Offset | | | | |
| 1 | 1 | 1 | 0 | | | Cond | | 8 Bit Branch Offset | | | | |
| 1 | 1 | 1 | 1 | 0 | | Long Branch and Link Segment | | | | | | |
| 1 | 1 | 1 | 1 | 1 | | Long Branch and Link Offset | | | | | | |

*Fig.8*

|  | ARM Register |
|---|---|
| General Register 0 | General Register 0 |
| General Register 1 | General Register 1 |
| General Register 2 | General Register 2 |
| General Register 3 | General Register 3 |
| General Register 4 | General Register 4 |
| General Register 5 | General Register 5 |
| General Register 6 | General Register 6 |
| General Register 7 | General Register 7 |
|  | General Register 8 |
|  | General Register 9 |
| Stack Limit | General Register 10 |
|  | General Register 11 |
|  | General Register 12 |
| Stack Pointer | Stack Pointer (R13) |
| Link Register | Link Register (R14) |
| Program Counter | Program Counter (R15) |
| CPSR | CPSR |
| SPSR | SPSR |

Fig.9

MULTIPLE INSTRUCTION SET MAPPING

BACKGROUND OF THE INVENTION

1. Field of the Invention

This invention relates to the field of data processing. More particularly, this invention relates to data processing using multiple sets of program instruction words.

2. Description of the Prior Art

Data processing systems operate with a processor core acting under control of program instruction words, which when decoded serve to generate core control signals to control the different elements with the processor to perform the necessary operations to achieve the processing specified in the program instruction word.

It is known to provide systems that operate with more than one instruction set (e.g. the VAX11 computers of Digital Equipment Corporation have a VAX instruction mode and a compatibility mode that enables them to decode the instructions for the earlier PDP11 computers). Such systems have typically incorporated a separate instruction decoders for each instruction set. Instruction decoders are relatively complex and large circuit elements.

The space that an integrated circuit occupies is at a premium. The smaller an integrated circuit is, the less expensive it will be to manufacture and the higher the manufacturing yield. In addition, additional space will be made available upon the integrated circuit for use by other circuit elements. Measures that reduce the size of an integrated circuit are strongly advantageous.

SUMMARY OF THE INVENTION

The invention operates with systems incorporating an instruction pipeline and serves to map instructions from a second instruction set to a first instruction set as they pass along the instruction pipeline. Translating the program instruction words From a second instruction set to those of a first instruction set avoids the need for a second instruction decoder and enables a simpler and more efficient embodiment of the rest of the processor core. The invention recognises that if the second instruction set is made to be a subset of the first instruction set, then a one to one mapping is possible and this may be achieved in a sufficiently regular and quick manner so as not to restrict system performance. Furthermore, the invention recognises that only some of the bits of the instructions from the second instruction set need to be mapped to corresponding bits of instruction words within the first instruction set to actually drive the decoding means and meet the timing requirements of the pipeline. This increases the speed at which the mapping may be performed.

The speed of instruction decoding is enhanced in preferred embodiments by the provision of an instruction register for holding an X-bit instruction being executed by said processor core, said processor core reading operand values from said instruction register.

In this way, the operands from within an instruction which do not require decoding by an instruction decoder but merely acting upon by the processor core, can be directly read from the instruction rather than having to pass through the instruction decoder.

In order to facilitate this arrangement whereby the critical P bits needed for driving the decoding means are generated rapidly and yet the full X-bit program instruction word is subsequently generated for unmodified use by the processor core, preferred embodiments of the invention comprise :second mapping means for mapping operand values within said Y-bit program instruction word within said instruction pipeline to corresponding positions within said corresponding X-bit program instruction word and storing said mapped operand values in said instruction register for use by said processor core.

The second mapping means could merely serve to map those operand values that are required by the processor core. However, the design of the instruction decoders can be effectively separated from that of the processor core, and so facilitate future independent change of either, by providing that said second mapping means maps said Y-bit program instruction word to a complete version of said corresponding X-bit program instruction word and stores said complete version of said corresponding X-bit program instruction word in said instruction register.

An associated less rigorous to that of when the core control signals must be available is that of when the operand values must be available. Preferred embodiments of the invention make use of this more relaxed requirement by providing that said second mapping means is operative to store said mapped operand values in said instruction register by the end of said decode cycle.

It will be appreciated that the operation of the first mapping means and the second mapping means may be made independent. The overall performance of the system is consequently improved if they operate in parallel.

The smaller size of the program instruction words of the second instruction set requires a modification of the functions that may be provided. It is preferred that the system be arranged such that said processor core has a plurality of registers used by said first instruction set and defined as register operands within some of said X-bit program instruction words and said second instruction set uses a subset of said registers defined as register operands within some of said Y-bit program instruction words.

The use by the second instruction set of a subset of the registers used by the first instruction set enables a one to one mapping between instructions still to be achieved and yet provides for the smaller bit sizes of the second instruction set.

In order to deal with the different manner of handling the registers between the instruction sets, said second mapping means extends said register operands of said Y-bit program instruction words to produce said register operands of said X-bit program instruction words.

In a similar manner, other operands within the second instruction set have a reduced range compared to those of the first instruction set and are zero extended at their high order end during mapping by the second mapping means.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 illustrates an X-bit instruction set;

FIG. 8 illustrates a Y-bit instruction set; and

FIG. 9 illustrates the processing registers available to the first instruction set and the second instruction set.

DESCRIPTION OF THE PREFERRED EMBODIMENTS

Figure 1:
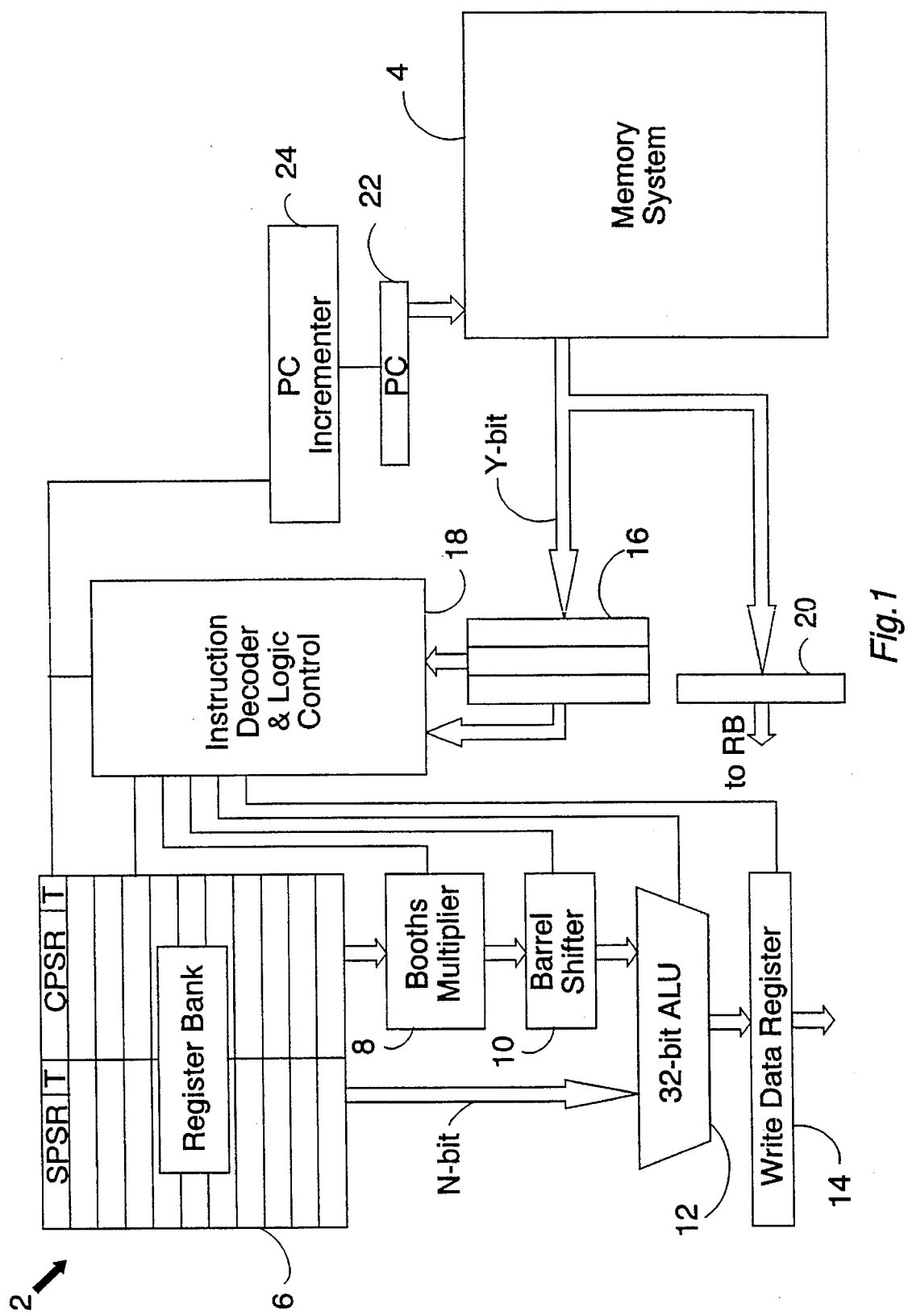
FIG. 1 schematically illustrates a data processing apparatus incorporating a processor core and a memory system.

FIG. 1 illustrates a data processing system (that is formed as part of an integrated circuit) comprising a processor core 2 coupled to a Y-bit memory system 4. In this case, Y is equal to 16.

The processor core 2 includes a register bank 6, a Booths multiplier 8, a barrel shifter 10, a 32-bit arithmetic logic unit 12 and a write data register 14. Interposed between the processor core 2 and the memory system 4 is an instruction pipeline 16, an instruction decoder 18 and a read data register 20. A program counter register 22, which is part of the processor core 2, is shown addressing the memory system 4. A program counter incrementer 24 serves to increment the program counter value within the program counter register 22 as each instruction is executed and a new instruction must be fetched for the instruction pipeline 16.

The processor core 2 incorporates N-bit data pathways (in this case 32-bit data pathways) between the various functional units. In operation, instructions within the instruction pipeline 16 are decoded by the instruction decoder 18 which produces various core control signals that are passed to the different functional elements within the processor core 2. In response to these core control signals, the different portions of the processor core conduct 32-bit processing operations, such as 32-bit multiplication, 32-bit addition and 32-bit logical operations.

The register bank 6 includes a current programming status register 26 and a saved programming status register 28. The current programming status register 26 holds various condition and status flags for the processor core 2. These flags may include processing mode flags (e.g. system mode, user mode, memory abort mode etc.) as well as flags indicating the occurrence of zero results in arithmetic operations, carries and the like. The saved programming status register 28 (which may be one of a banked plurality of such saved programming status registers) is used to temporarily store the contents of the current programming status register 26 if an exception occurs that triggers a processing mode switch. In this way, exception handling can be made faster and more efficient.

Included within the current programming status register 26 is an instruction set flag T. This instruction set flag is supplied to the instruction decoder 18 and the program counter incrementer 24. When this instruction set flag T is set, the system operates with the instructions of the second instruction set (i.e. Y-bit program instruction words, in this case 16-bit program instruction words). The instruction set flag T controls the program counter incrementer 24 to adopt a smaller increment step when operated with the second instruction set. This is consistent with the program instruction words of the second instruction set being smaller and so more closely spaced within the memory locations of the memory system 4.

As previously mentioned, the memory system 4 is a 16-bit memory system connected via 16-bit data buses to the read data register 20 and the instruction pipeline 16. Such 16-bit memory systems are simpler and inexpensive relative to higher performance 32-bit memory systems. Using such a 16-bit memory system, 16-bit program instruction words can be fetched in a single cycle. However, if 32-bit instructions from the second instruction set are to be used (as indicated by the instruction set flag T), then two instruction fetches are required to recover a single 32-bit instruction for the instruction pipeline 16.

Once the required program instruction words have been recovered from the memory system 4, they are decoded by the instruction decoder 18 and initiate 32-bit processing within the processor core 2 irrespective of whether the instructions are 16-bit instructions or 32-bit instructions.

The instruction decoder 18 is illustrated in FIG. 1 as a single block. However, in order to deal with more than one instruction set, the instruction decoder 18 has a more complicated structure as will be discussed in relation to FIGS. 2 and 3.

Figure 2:
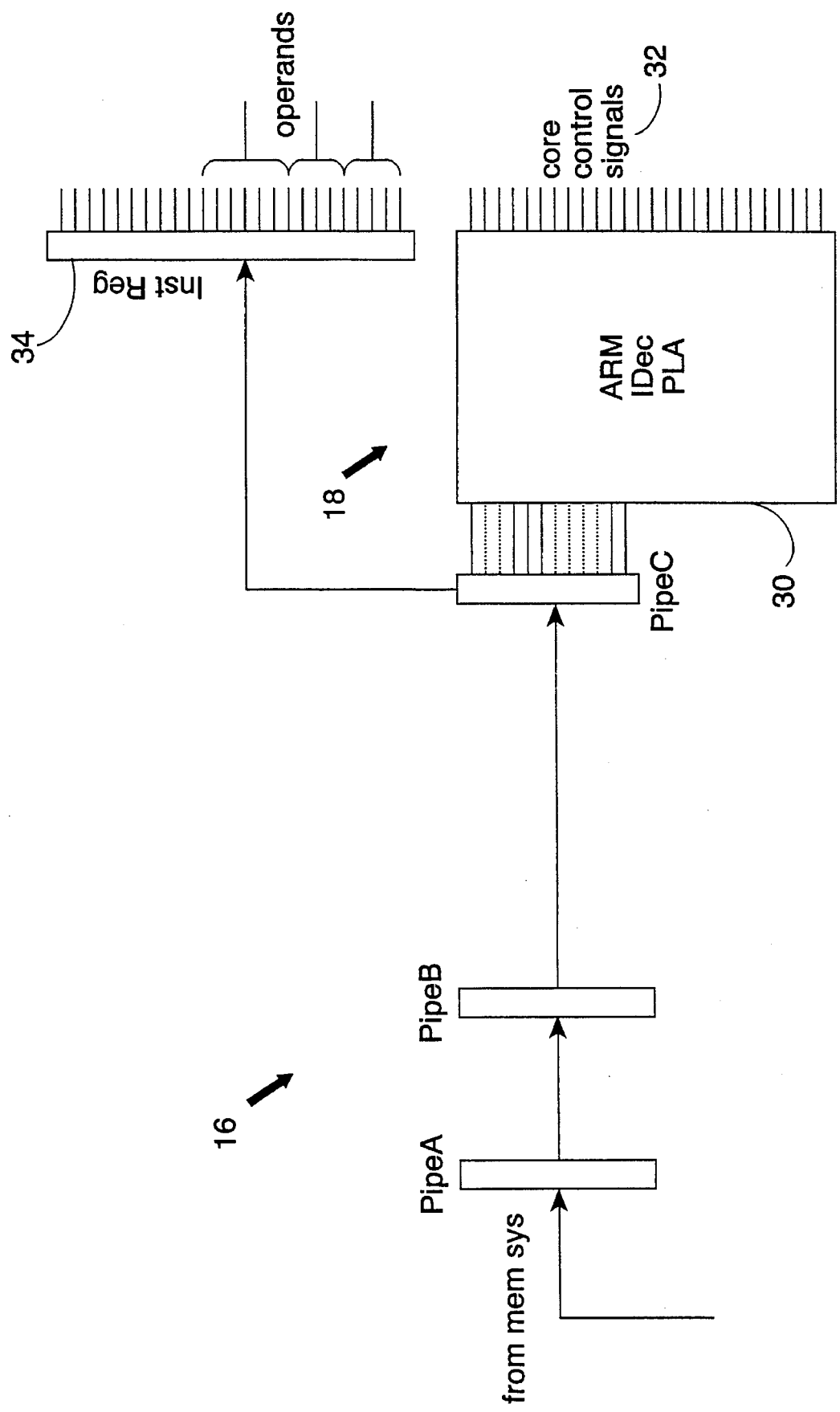
FIG. 2 schematically illustrates an instruction and instruction decoder for a system having a single instruction set.

FIG. 2 illustrates the instruction pipeline 16 and an instruction decoder 18 for coping with a single instruction set. In this case, the instruction decoder 18 includes only a first decoding means 30 that is operative to decode 32-bit instructions. This decoding means 30 decodes the first instruction set (the ARM instruction set) utilising a programmable logic array (PLA) to produce a plurality of core control signals 32 that are fed to the processor core 2. The program instruction word which is currently decoded (i.e. yields the current the core control signals 32) is also held within an instruction register 34. Functional elements within the processor core 2 (e.g. the Booths multiplier 8 or the register bank 6) read operands needed for their processing operation directly from this instruction register 34.

A feature of the operation of such an arrangement is that the first decoding means 30 requires certain of its inputs (the P bits shown as solid lines emerging from the PipeC pipeline stage) early in the clock cycle in which the first decoding means operates. This is to ensure that the core control signals 32 are generated in time to drive the necessary elements within the processor core 2. The first decoding means 30 is a relatively large and slow programmable logic array structure and so such timing considerations are important.

The design of such programmable logic array structures to perform instruction decoding is conventional within the art. A set of inputs are defined together with the desired outputs to be generated from those inputs. Commercially available software is then used to devise a PLA structure that will generate the specified set of outputs from the specified set of inputs.

Figure 3:
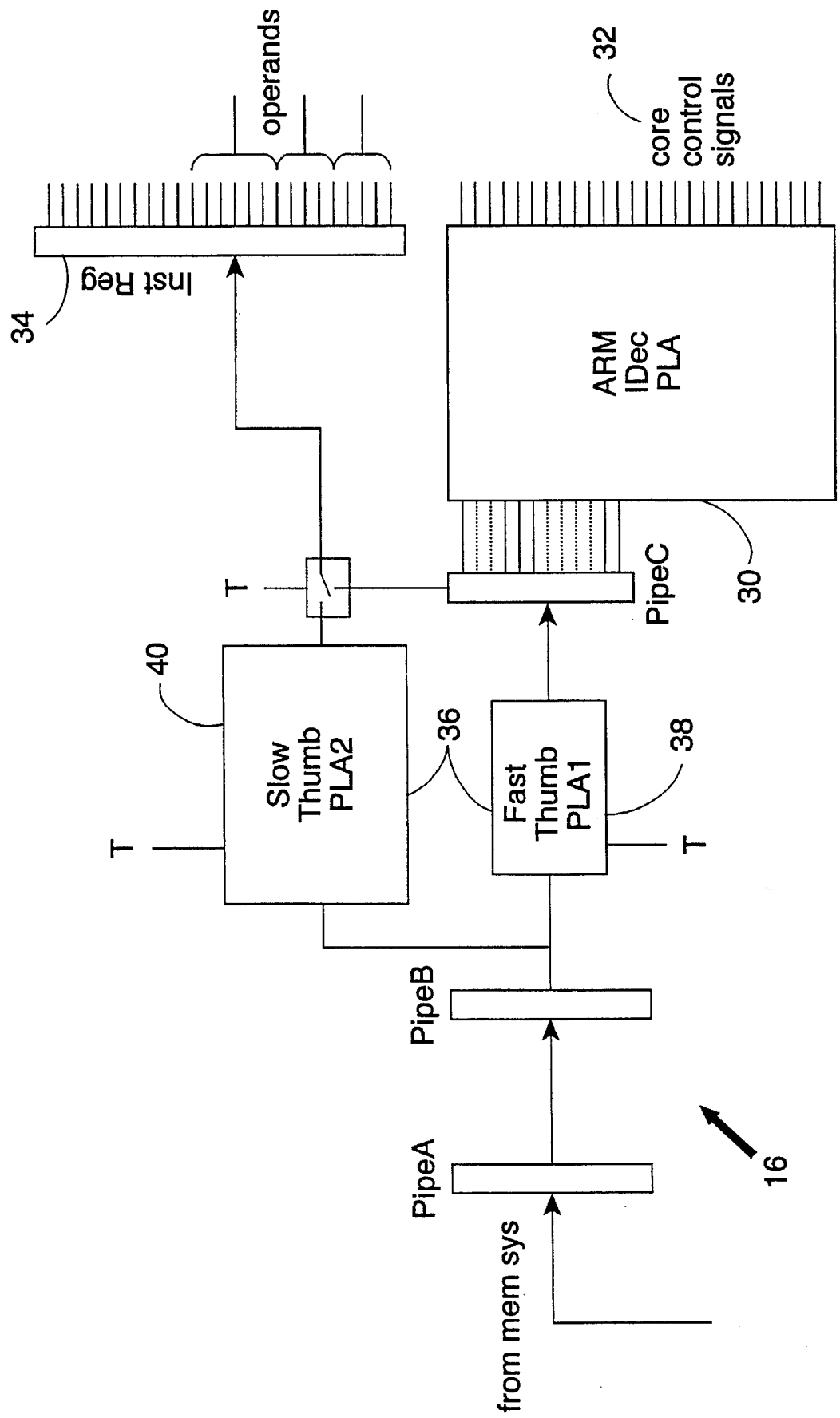
FIG. 3 illustrates an instruction pipeline and instruction decoders for use in a system having two instruction sets.

FIG. 3 illustrates the system of FIG. 2 modified to deal with decoding a first instruction set and a second instruction set. When the first instruction set is selected by the instruction set flag T, then the system operates as described in relation to FIG. 2. When the instruction set flag T indicates that the instructions in the instruction pipeline 16 are from the second instruction set, a second decoding means 36 becomes active.

This second decoding means decodes the 16-bit instructions (the Thumb instructions) utilising a fast PLA 38 and a parallel slow PLA 40. The fast PLA 38 serves to map a subset (Q bits) of the bits of the 16-bit Thumb instructions to the P bits of the corresponding 32-bit ARM instructions that are required to drive the first decoding means 30. Since a relatively small number of bits are required to undergo this mapping, the fast PLA 38 can be relatively shallow and so operate quickly enough to allow the first decoding means sufficient time to generate the cope control signals 32 in response to the contents of PipeC. The fast PLA 38 can be considered to act to "fake" the critical bits of a corresponding 32-bit instruction fop the first decoding means without spending any unnecessary time mapping the full instruction.

However, the Full 32-bit instruction is still required by the processor core 2 if it is to be able to operate without radical alterations and significant additional circuit elements. With the time critical mapping having been taken care of by the fast PLA 38, the slow PLA 40 connected in parallel serves to map the 16-bit instruction to the corresponding; 32-bit instruction and place this into the instruction register 34. This mope complicated mapping may take place over the full time it takes the fast PLA 38 and the first decoding means 30 to operate. The important factor is that the 32-bit instruction should be present within the instruction register 34 in sufficient time for any operands to be read therefrom in response to the core control signals 32 acting upon the processor core 2.

It will be appreciated that the overall action of the system of FIG. 3 when decoding the second instruction set is to translate 16-bit instructions from the second instruction set to 32-bit instructions from the first instruction set as they progress along the instruction pipeline 16. This is rendered a practical possibility by making the second instruction set a subset of a first instruction set so as to ensure that there is a one to one mapping of instructions from the second instructions set into instructions within the first instruction set.

The provision of the instruction set flag T enables the second instruction set to be non-orthogonal to the first instruction set. This is particularly useful in circumstances where the first instruction set is an existing instruction set without any free bits that could be used to enable an orthogonal further instruction set to be detected and decoded.

Figure 4:
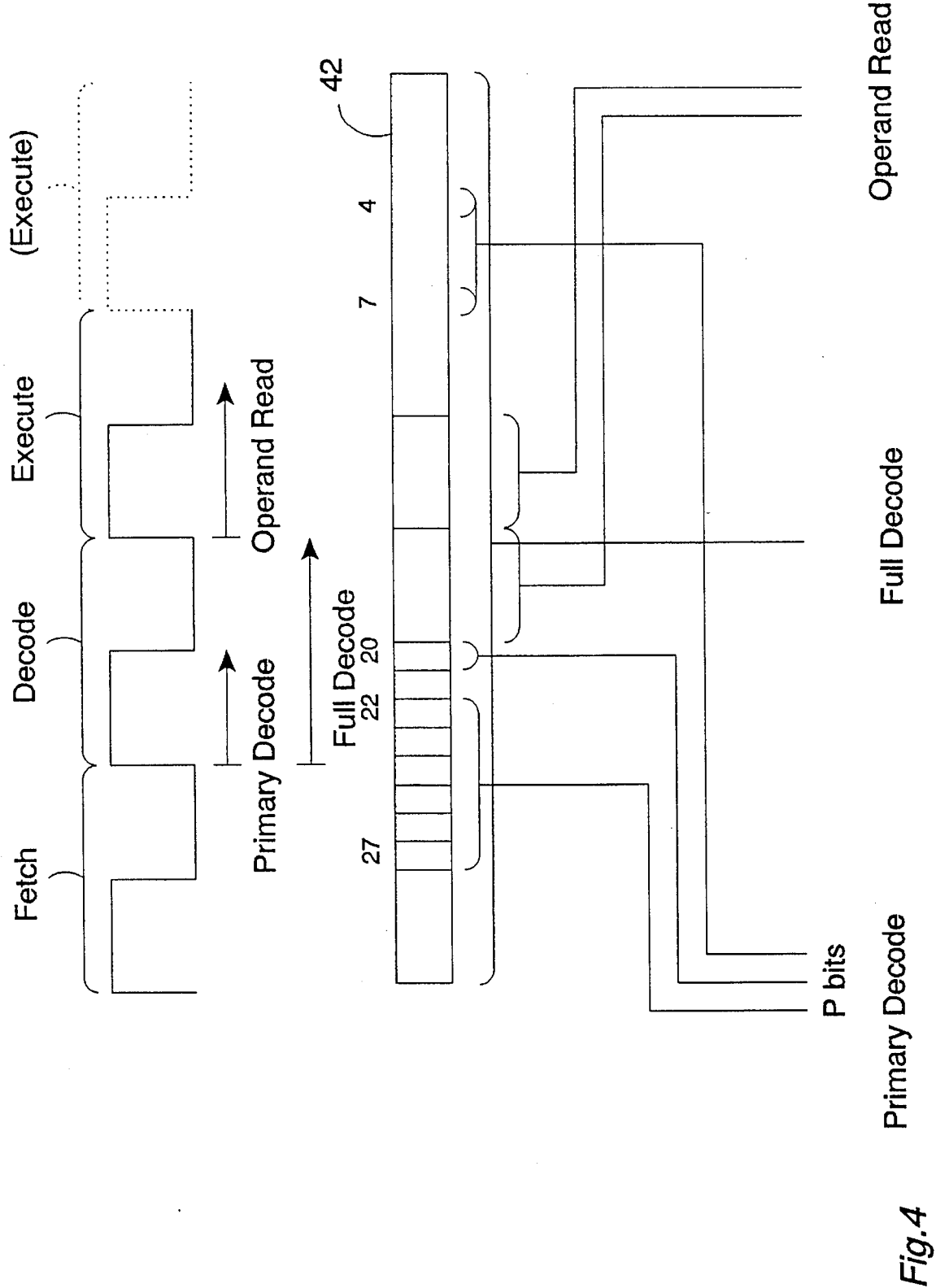
FIG. 4 illustrates the decoding of an X-bit program instruction word.

FIG. 4 illustrates the decoding of a 32-bit instruction. At the top of FIG. 4 successive processing clock cycles are illustrated in which a fetch operation, a decode operation and finally an execute operation performed. If the particular instruction so requires (e.g. a multiply instruction), then one or more additional execute cycles may be added.

A 32-bit instruction 42 is composed of a plurality of different fields. The boundaries between these fields will differ for differing instructions as will be shown later in FIG. 7.

Some of the bits within the instruction 42 require decoding within a primary decode phase. These P bits are bits 4 to 7, 20 and 22 to 27. These are the bits that are required by the first decoding means 30 and that must be "faked" by the fast PLA 38. These bits must be applied to the first decoding means and decoded thereby to generate appropriate core control signals 32 by the end of the first part of the decode cycle. Decoding of the full instruction can, if necessary, take as long as the end of decode cycle. At the end of the decode cycle, operands within the instruction are read from the instruction register 34 by the processor 2 during the execute cycle. These operands may be register specifiers, offsets or other variables.

Figure 5:
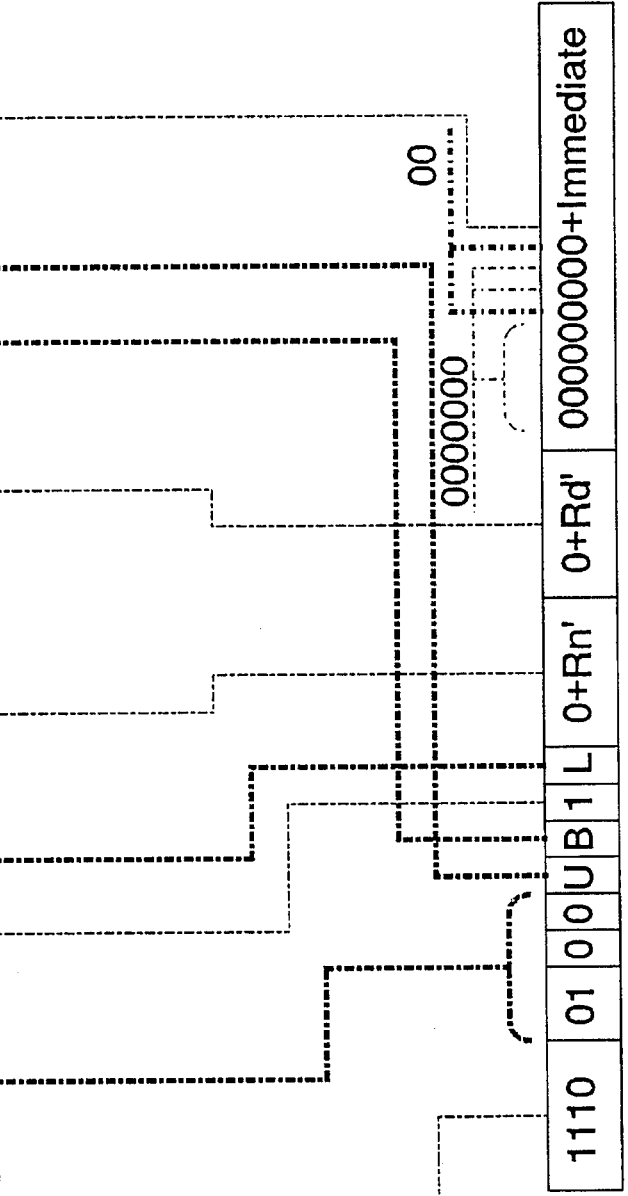
FIGS. 5 and 6 illustrate the mapping of Y-bit program instruction words to X-bit program instruction words.

FIG. 5 shows the mapping of an example of 16-bit instruction to a 32-bit instruction. The thick lines originate from the Q bits within the 16-bit instruction that require mapping into the P bits within the 32-bit instruction so that they may be applied to the first decoding means 30. It will be seen that the majority of these bits are either copied straight across or involve a simple mapping. The operands Rn', Rd and Immediate within the 16-bit instruction require padding at their most significant end with zeros to fill the 32-bit instruction. This padding is needed as a result of the 32-bit instruction operands having a greater range than the 16-bit instruction operands.

It will be seen from the generalised form of the 32-bit instruction given at the bottom of FIG. 5, that the 32-bit instruction allows considerably more flexibility than the subset of that instruction that is represented by the 16-bit instruction. For example, the 32-bit instructions are preceded by condition codes Cond that renders the instruction conditionally executable. In contrast, the 16-bit instructions do not carry any condition codes in themselves and the condition Codes of the 32-bit instructions to which they are mapped are set to a value of "1110" that is equivalent to the conditional execution state "always".

Figure 6:
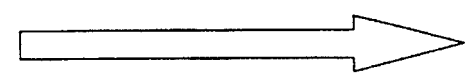

FIG. 6 illustrates another such instruction mapping. The 16-bit instruction in this case is a different type of Load/Store instruction to that illustrated in FIG. 5. However, this instruction is still a subset of the single data transfer instruction of the 32-bit instruction set.

FIG. 7 schematically illustrates the formats of the eleven different types of instruction for the 32-bit instruction set. These instructions are in turn:
1. Data processing PSR transfer;
2. Multiply;
3. Single data Swap;
4. Single data transfer;
5. Undefined;
6. Block data transfer;
7. Branch;
8. Co-processor data transfer;
9. Co-processor data operation; and
10. Co-processor register transfer.
11. Software interrupt.

A full description of this instruction set may be found in the Data Sheet of the ARM6 processor produced by Advanced RISC Machines Limited. The instruction highlighted within FIG. 7 is that illustrated in FIGS. 5 and 6.

FIG. 8 illustrates the 16-bit instruction set that is provided in addition to the 32-bit instruction set. The instructions highlighted within this instruction set are those illustrated in FIGS. 5 and 6 respectively. The instructions within this 16-bit instruction set have been chosen such that they may all be mapped to a single 32-bit instruction and so form a subset of the 32-bit instruction set.

Passing in turn between each of the instructions in this instruction set, the formats specify the following:

| | |
|---|---|
| Format 1: | Op = 0,1. Both ops set the condition code flags.<br>0: ADD Rd, Rs, #Immediate3<br>1: SUB Rd, Rs, #Immediate3 |
| Format 2: | Op = 0,1. Both ops set the condition code flags.<br>0: ADD Rd, Rm, Rn<br>1: SUB Rd, Rm, Rn |
| Format 3: | 3 opcodes. Used to build large immediates.<br>1 = ADD Rd, Rd, #Immediate 8<<8<br>2 = ADD Rd, Rd, #Immediate 8<<16<br>3 = ADD Rd, Rd, #Immediate 8<<24 |
| Format 4: | Op gives 3 opcodes, all operations are MOVS Rd, Rs SHIFT #Immediate5, where SHIFT is<br>0 is LSL<br>1 is LSR<br>2 is ASR<br>Shifts by zero as defined on ARM. |
| Format 5: | Op1*8+Op2 gives 32 ALU opcodes, Rd = Rd op Rn.<br>All operations set the condition code flags.<br>The operations are<br>AND, OR, EOR, BIC (AND NOT), NEGATE, CMP, CMN, MUL TST, TEQ, MOV, MVN(NOT), LSL, |

|  |  |
|---|---|
|  | LSR, ASR, ROR Missing ADC, SBC, MULL |
|  | Shifts by zero and greater than 31 as defined on ARM |
|  | 8 special opcodes, LO specifies Reg 0–7, HI specifies a register 8–15 |
|  | SPECIAL is CPSR or SPSR |
|  | MOV HI, LO (move hidden register to visible register) |
|  | MOV LO, HI (move visible register to hidden register) |
|  | MOV HI, HI (eg procedure return) |
|  | MOVS HI, HI (eg exception return) |
|  | MOVS HI, LO (eg interrupt return, could be SUBS, HI, HI, #4) |
|  | MOV SPECIAL, LO (MSR) |
|  | MOV LO, SPECIAL (MRS) |
|  | CMP HI, HI (stack limit check) |
|  | 8 free opcodes |
| Format 6: | Op gives 4 opcodes. All operations set the condition code flags |
|  | 0: MOV Rd,#Immediate 8 |
|  | 1: CMP Rs,#Immediate 8 |
|  | 2: ADD Rd, Rd,#Immediate 8 |
|  | It is possible to trade ADD for ADD Rd, Rs, #Immediate5 |
| Format 7: | Loads a word PC + Offset (256 words, 1024 bytes). Note the offset must be word aligned. |
|  | LDR Rd,[PC,#+1024] |
|  | This instruction is used to access the next literal pool, to load constants, addresses etc. |
| Format 8: | Load and Store Word from SP (r7) + 256 words (1024 bytes) |
|  | Load and Store Byte from SP(r7) + 256 bytes |
|  | LRD Rd,[SP,#+1024] |
|  | LDRB Rd,[SP,#+256] |
|  | These instructions are for stack and frame access. |
| Format 9: | Load and Store Word (or Byte), signed 3 bit Immediate Offset (Post Inc/Dec), Forced Writeback |
|  | L is Load/Store, U is Up/Down (add/subtract offset), B is Byte/Word |
|  | LDR {B} Rd, [Rb],#+/–Offset3 |
|  | STR {B} Rd, [Rb],#+/–Offset3 |
|  | These instructions are intended for array access |
|  | The offset encodes 0 – 7 for bytes and 0, 4 – 28 for words |
| Format 10: | Load and Store Word (or Byte) with signed Register Offset (Pre Inc/Dec), No writeback |
|  | L is Load/Store, U is Up/Down (add/subtract offset), B is Byte/Word |
|  | LDR Rd,[Rb, +/–Ro, LSL#2] |
|  | STR Rd,[Rb, +/–Ro, LSL#2] |
|  | LDRB Rd,[Rb, +/–Ro] |
|  | STRB Rd,[Rb, +/–Ro] |
|  | These instructions are intended for base + offset pointer access, and combined with the 8-bit MOV, ADD, SUB give fairly quick immediate offset access. |
| Format 11: | Load and Store Word (or Byte) with signed 5 bit Immediate Offset (Pre Inc/Dec), No Writeback |
|  | L is Load/Store B is Byte/Word |
|  | LDR{B} Rd, [Rb,#+Offset5] |
|  | STR{B} Rd, [Rb,#+Offset5] |
|  | These instructions are intended for structure access |
|  | The offset encodes 0 – 31 for bytes and 0, 4 – 124 for words |
| Format 12: | Load and Store Multiple (Forced Writeback) |
|  | LDMIA Rb!, {Rlist} |
|  | STMIA Rb!, {Rlist} |
|  | Rlist specify registers r0–r7 |
|  | A sub-class of these instructions are a pair of subroutine call and return instructions. |
|  | For LDM if r7 is the base and bit 7 is set in rlist, the PC is loaded |
|  | For STM if r7 is the base and bit 7 is set in rlist, the LR is stored |
|  | If r7 is used as the base register, sp is used instead |
|  | In both cases a Full Descending Stack is implemented |
|  | ie LDM is like ARM's LDMFD, STM is like ARM's STMFD So for block copy, use r7 as the end pointer |
|  | If r7 is not the base, LDM and STM is like ARMs LDMIA, STMIA |
| Format | Load address. This instruction adds an 8 bit unsigned |
| 13: | constant to either the PC or the stack pointer and stores the results in the destination register. |
|  | ADD Rd, sp, + 256 bytes |
|  | ADD Rd, pc, + 256 words (1024 bytes) |
|  | The SP bit indicates if the SP or the PC is the source. |
|  | If SP is the source, and r7 is specified as the destination register, SP is used as the destination register. |
| Format 14: | Conditional branch, +/– 128 bytes, where cond defines the condition code (as on ARM) cond = 15 encodes as SWI (only 256, should be plenty). |
| Format 15: | Sets bits 22:12 of a long branch and link. MOV lr, #offset << 12. |
| Format 16: | Performs a long branch and link. Operation is SUB newlr, pc, #4; ORR pc, oldlr, #offset <<1. newlr and oldlr mean the lr register before and after the operation. |

As previously mentioned, the 16-bit instruction set has reduced operand ranges compared to the 32-bit instruction set. Commensurate with this, the 16-bit instruction set uses a subset of the registers 6 (see FIG. 1) that are provided for the full 32-bit instruction set. FIG. 9 illustrates the subset of registers that are used by the 16-bit instruction set.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:

(i) a processor core responsive to a plurality of core control signals;

(ii) decoding means for decoding P bits of an X-bit program instruction word of a first instruction set to generate said core control signals;

(iii) an instruction pipeline through which instruction program words are passed to said decoding means; and (iv) first mapping means responsive to a Y-bit program instruction word of a second instruction set passing along said instruction pipeline for mapping Q bits of said Y-bit program instruction word to said P bits of a corresponding X-bit program instruction word for decoding by said decoding means, wherein (v) Y is less than X, P is less than X and said second instruction set is a subset of said first instruction set; and (vi) instruction program words pass through said instruction pipeline over a plurality of processing cycles, one of said processing cycles being a decode cycle, said decoding means being operative to produce said core control signals by the end of said decode cycle and said first mapping means being operative to produce said P bits of said corresponding X-bit program instruction word during a first portion of said decode cycle to enable said decoding means still to produce said core control signals by the end of said decode cycle.

2. Apparatus as claimed in claim 1, comprising an instruction register for holding an X-bit instruction being executed by said processor core, said processor core reading operand values from said instruction register.

3. Apparatus as claimed in claim 2, comprising second mapping means for mapping operand values within said Y-bit program instruction word within said instruction pipeline to corresponding positions within said corresponding X-bit program instruction word and storing said mapped operand values in said instruction register for use by said processor core.

4. Apparatus as claimed in claim 3, wherein said second mapping means maps said Y-bit program instruction word to a complete version of said corresponding X-bit program instruction word and stores said complete version of said corresponding X-bit program instruction word in said instruction register.

5. Apparatus as claimed in claim 2, comprising second mapping means for mapping operand values within said Y-bit program instruction word within said instruction pipeline to corresponding positions within said corresponding X-bit program instruction word and storing said mapped operand values in said instruction register for use by said processor core and wherein said second mapping means is operative to store said mapped operand values in said instruction register by the end of said decode cycle.

6. Apparatus as claimed in claim 3, wherein said second mapping means operates in parallel with said first mapping means.

7. Apparatus as claimed in claim 3, wherein said operands of said X-bit program instruction words have a greater range than said operands of said Y-bit program instruction words and said second mapping means high order zero extends said operands from said Y-bit program instruction words to yield and operands of said X-bit program instruction words.

8. Apparatus as claimed in claim 1, wherein said processor core has a plurality of registers used by said first instruction set and defined as register operands within some of said X-bit program instruction words and said second instruction set uses a subset of said registers defined as register operands within some of said Y-bit program instruction words.

9. Apparatus as claimed in claim 8, comprising an instruction register for holding an X-bit instruction being executed by said processor core, said processor core reading operand values from said instruction register, and second mapping means for mapping operand values within said Y-bit program instruction word within said instruction pipeline to corresponding positions within said corresponding X-bit program instruction word and storing said mapped operand values in said instruction register for use by said processor core and wherein said second mapping means extends said register operands of said Y-bit program instruction words to produce said register operands of said X-bit program instruction words.

10. Apparatus as claimed in claim 1, wherein Q is less than or equal to P.

11. Apparatus as claimed in claim 1, wherein X is 32 and Y is 16.

12. Apparatus as claimed in claim 1, wherein said apparatus is an integrated circuit.

13. A method of processing data, said method comprising the steps of:

(i) providing a processor core responsive to a plurality of core control signals;

(ii) decoding P bits of an X-bit program instruction word of a first instruction set with a decoding means to generate core control signals for controlling a processor core;

(iii) passing instruction program words through an instruction pipeline to said decoding means; and (iv) mapping Q bits of a Y-bit program instruction word of a second instruction set passing along said instruction pipeline to said P bits of a corresponding X-bit program instruction word for decoding by said decoding means, wherein (v) Y is less than X, P is less than X and said second instruction set is a subset of said first instruction set; and (vi) instruction program words pass through said instruction pipeline over a plurality of processing cycles, one of said processing cycles being a decode cycle, said decoding operating to produce said core control signals by the end of said decode cycle, and said mapping operating to produce said P bits of said corresponding X-bit program instruction word during a first portion of said decode cycle to enable production of said core control signals by the end of said decode cycle.

* * * * *